United States Patent [19]

Choi et al.

[11] Patent Number: 4,728,778
[45] Date of Patent: Mar. 1, 1988

[54] COOKING APPARATUS

[76] Inventors: Dai S. Choi; WongJung O. Choi, both of 3101 Palm Ave., Manhattan Beach, Calif. 90266

[21] Appl. No.: 927,077

[22] Filed: Nov. 5, 1986

[51] Int. Cl.⁴ .............................................. H05B 3/68
[52] U.S. Cl. .................... 219/438; 219/432; 219/440; 219/437; 99/293; 126/381
[58] Field of Search ............... 219/436, 438, 440, 441, 219/429, 432, 435, 437, 521, 433, 442, 431, 439; 99/425, 446, 444, 293, 347; 126/369, 369.2, 381, 382, 383, 386

[56] References Cited

U.S. PATENT DOCUMENTS

| | | | |
|---|---|---|---|
| 463,950 | 11/1891 | Hutchings | 99/293 |
| 684,423 | 10/1901 | Gellenbeck | 126/381 |
| 800,069 | 9/1905 | Brown | 126/381 |
| 1,086,986 | 3/1914 | Blodgett | 126/381 |
| 1,468,908 | 9/1923 | Krafft | 126/381 |
| 1,822,257 | 9/1931 | Wentorf | 126/382 |
| 3,209,746 | 10/1965 | Giuseppe | 126/381 |
| 3,251,358 | 5/1966 | Short | 126/381 |
| 4,539,899 | 9/1985 | Schmitt | 126/381 |

FOREIGN PATENT DOCUMENTS 1146350  3/1969  United Kingdom ............... 219/437

Primary Examiner—Clifford C. Shaw
Assistant Examiner—Teresa J. Walberg
Attorney, Agent, or Firm—Birch, Stewart, Kolasch & Birch

[57] ABSTRACT

An electrical cooking apparatus for cooking natural substances such as rice, herbs, soups, and the like, the cooking device being divided into a lower cooking chamber and an upper cooling chamber, which includes a cooking container disposed within the lower cooking chamber, a valve member providing communication between the upper cooling chamber and the lower cooking container whereby the cooking steam rising from the cooking container and introduced through the valve member into the cooling chamber is condensed and returned as a liquid to the cooking container, a downwardly inclined baffle member disposed beneath the valve member for interrupting the flow of condensed liquid through the valve member and directing it to the side walls of the cooking chamber, and a heating member for the cooking apparatus.

3 Claims, 3 Drawing Figures

COOKING APPARATUS

BACKGROUND OF THE INVENTION

The present invention relates to a cooking apparatus. More particularly, the present invention as directed to a cooking device containing a cooling system disposed in a removable lid member and a sloping baffle member for draining water to the wall of a pot of the cooking device whereby food can be cooked in a delicious manner while at the same time substantially eliminating the smell of the cooking vapors.

Electric rice cookers are well known in the art as disclosed in U.S. Pat. Nos. 4,315,138, 4,314,139 and 4,438,324. However, there are many problems associated with these prior art devices, for example, water which condensed from the steam drops directly into the cooking food which dilutes the food making it not so delicious. Also there is the danger that the cooker will explode as a result of the high pressure caused by the steam during the cooking operations additionally there is no known way to eliminate the odor of the cooking vapor.

OBJECTS AND SUMMARY OF THE INVENTION

Accordingly, it is an object of the present invention to provide an improved cooking apparatus containing a cooking chamber disposed in the lid member thereof.

Another object of the present invention is to provide a cooking apparatus which contains a sloping baffle member having a plurality of valleys and ridges disposed in the surface thereof, which engages with the upper portion of a tapered pot or kettle of the cooking apparatus for draining water condensed from the steam to the walls of the cooking pot whereby the circulation of steam and water of the present invention repeats until the food is completely cooked to prevent the cooking food from roasting.

A further object of the present invention is to provide a cooking device which is structured with a safety valve disposed in the lid member. The safety valve can be automatically opened by a predetermined pressure which develops in the inside of the cooking device.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art form this detailed description.

The present invention relates to a cooking apparatus for cooking rice, herbs or soup materials, which comprises a main body having a pot or kettle disposed therein, a sloping baffle member having a plurality of valleys and ridges and disposed in the top of the pot, and a removable lid containing a cooling chamber therein and provided with a safety valve whereby the cooking apparatus is provided with a water circulation wherein steam which is condensed into water is directed to the wall of the cooking pot or kettle where the hot walls partially evaporate the water, thereby preventing the food from becoming diluted. Also this procedure substantially eliminates the cooking odor. Also, the threat of explosion is effectively eliminated by the reduction of the internal steam pressure.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 1:
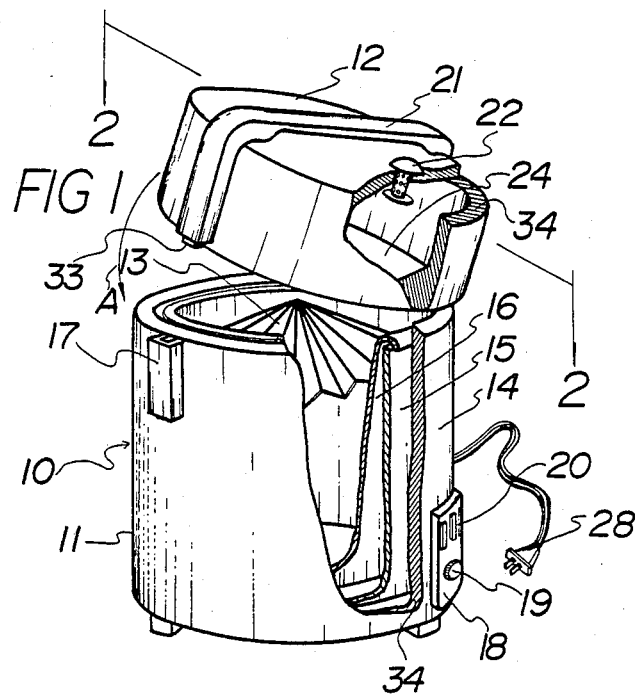
FIG. 1 is a perspective view of a cooking device containing a cut out portion showing the internal structure of the main body and lid member of the present invention.
Figure 2:
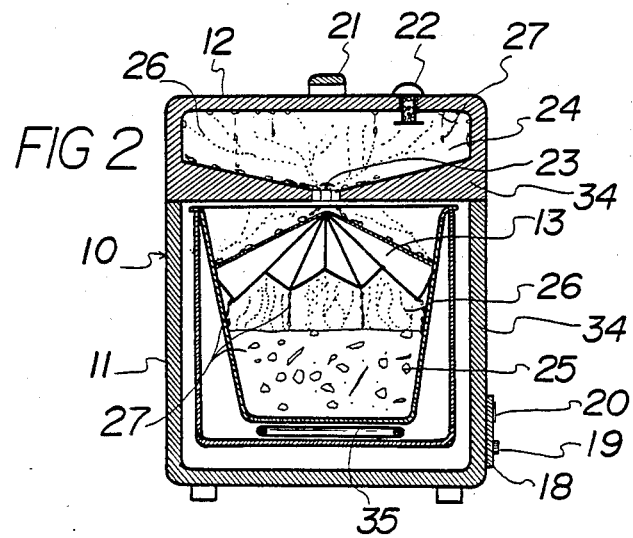
FIG. 2 is a sectional view of FIG. 1, taken along line 2—2.
Figure 3:
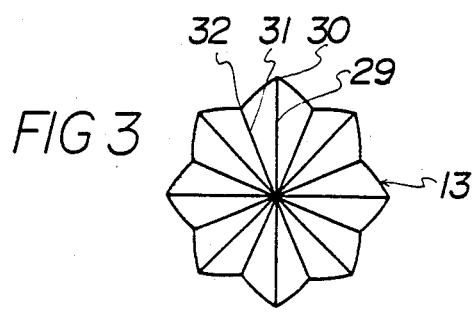
FIG. 3 is a top plan view of the sloping baffle member of the cooking device of the present invention.

Referring now in detail to the drawings for the purpose of illustrating the present invention, a cooking device 10 as shown in FIGS. 1 and 2 comprises a main body 11 and a lid member 12. The main body 11 includes an outer case 14 and an inner case 15. A thermal insulating material 34 is sandwiched between the outer and inner cases 14 and 15. The inner case 14 is provided with a pot, e.g. a tapered pot or kettle 16 disposed therein. The pot or kettle 16 is used to cook natural substances such as rice, herbs or soup materials 25 utilizing a proper amount of water 27. The pot or kettle 16 is provided with a sloping baffle member 13 for substantially covering the pot and draining water 27 to the wall of the pot 16. As shown in FIG. 3, the sloping baffle member 13 contains a plurality of ridges 31 and valleys 29. The ridges 31 and valleys 29 terminate at points 32 and 30, respectively, near and close near the side walls of the pot 16. Therefore, when the sloping baffle member 13 is inserted in the tapered pot or kettle 16, the sloping baffle member 13 engages the upper portion of the pot or kettle 16 by contacting the walls thereof with the plurality of end portions 30 (FIG. 2). Accordingly, the condensed water 27 produced by the cooking vapor or steam 26 from the cooking materials 25 of the pot 16 is drained through the plurality of valleys 29 and pointed end portions 30. Thus, the length of the valleys 29 is longer than that of the ridges 31 of the sloping baffle member 13. The main body 11 includes an indicating plate 18 disposed at the outer surface thereof which contains a timer 19 and a cooking indicator 20 disposed on the indicating plate 18 for controlling the predetermined cooking time and the electrical heater 35. The lid member 12 having a handle 21 includes a cooling chamber 24 disposed therein and has a cooling function utilizing a conventional cooling system. The thermal insulating material 34 is sandwiched between the lid member 12 and the cooling chamber 24. The cooling chamber 24 is provided with a valve 23 which communicates with the pot or kettle 16 for releasing steam 26 and directing the condensed fluid to the cooking chamber. Also the cooling chamber 24 is provided with a safety valve 22 for preventing the cooking device 10 from exploding due to excess steam pressure. The lid member 12 is hinge-mounted at the opening to the main body 11 of the cooking apparatus to be swingable or movable in the direction indicated by arrow A. A male engaging member 33 disposed opposite the hinge shaft of the lid member 12 is tightly engaged a female engaging member 17 of the main body 11 thereby the cooking device 10 is tightly closed to substantially thermally insulated it from the enviroment.

In operation, the pot 16 of the cooking device 10 is provided with rice or soup materials 25 and water 27 and is heated by the electrical heater 35 using electric plug 28. During heating and cooking, steam 26 is transferred from the pot to the cooling chamber 24 of the lid member 12 through the valve 23. At this time, the steam 26 is cooled and condensed into water 27 in the cooling chamber 24 since the lid member is a kind of cooling apparatus. Water 27 in the cooling chamber 24 runs down the sloping baffle member 13 through the valve 23. The water 27 is collected on the sloping baffle member 13 is in the plurality of valleys 29 and drained to the tapered wall of the pot or kettle 16 through the plurality of pointed end portions 30. The circulation of steam and water of the present invention repeats until the food is completely cooked.

According to the present invention, during the cooking operation, such as during the boiling of rice or the cooking of soup, water condensed from the steam does not drop directly into the food but rather the water is directed to contact the hot walls of the pot or kettle 16 where it is at least partially evaporated so as not to dilute the taste of the food.

Furthermore, since the vapors 27 from the cooking food are not removed from the cooking device 10 of the present invention, the problems of eliminating the cooking smell of the cooking vapors is substantially eliminated. For example, herbs are to be extracted using the cooking device of the present invention, the herb smell can be materially reduced.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. An electrical cooking apparatus for cooking natural substances such as rice, herbs soups, and the like, said cooking device being divided into a lower cooking chamber and an upper cooling chamber which comprises:
   a cooking container disposed within said lower cooking chamber,
   valve means providing communication between said upper cooling chamber and said cooking container whereby the cooking steam rising from the cooking container and introduces through said valve means into said cooling chamber is condensed and returned as a liquid to said cooking container,
   downwardly inclined baffle means disposed within the cooking container and beneath said valve means for interrupting the flow of condensed liquid through said valve means and directing it to the side walls of the cooking container, said baffle means having a generally circular configuration, with a surface structure comprising a plurality of ridges and valleys, said valleys terminating in pointed end portions which contact side walls of the cooking container and said ridges terminating in portions which extend away from the side walls, and
   means for heating said cooking apparatus.

2. The electrical cooking apparatus of claim 1 wherein the length of the valley is longer than that of the ridge.

3. The electrical cooking apparatus of claim 1 wherein a lid contains a safety valve which provides communication between the cooling chamber and the environment, said safety valve automatically opening when a predetermined pressure in the cooking chamber is exceeded.

* * * * *

UNITED STATES PATENT AND TRADEMARK OFFICE
CERTIFICATE OF CORRECTION

PATENT NO. : 4,728,778
DATED : March 1, 1988
INVENTOR(S) : Dai Sung CHOI and WonJung OH CHOI It is certified that error appears in the above-identified patent and that said Letters Patent is hereby corrected as shown below:

In category "[76] Inventors", please change

"WongJung O. Choi" to --WonJung Oh Choi--.

Signed and Sealed this

Thirty-first Day of January, 1989

Attest:

DONALD J. QUIGG

Attesting Officer

Commissioner of Patents and Trademarks